N. W. STORER.
RAILWAY VEHICLE.
APPLICATION FILED APR. 4, 1906.
1,087,053.
Patented Feb. 10, 1914.
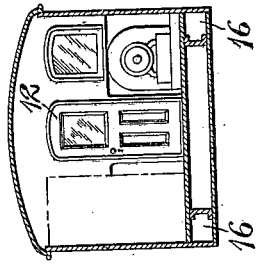
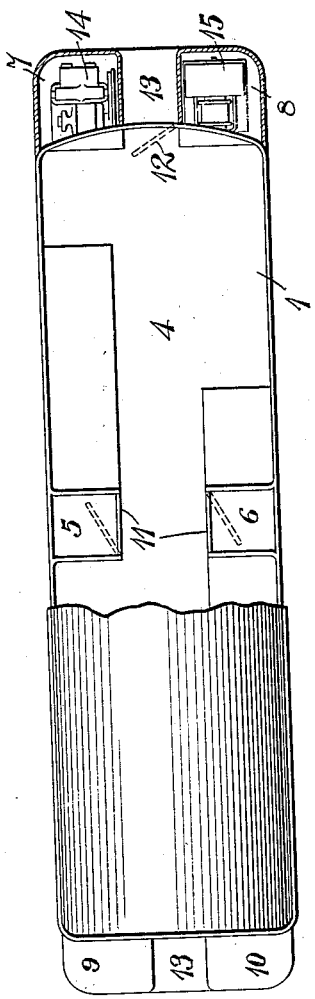
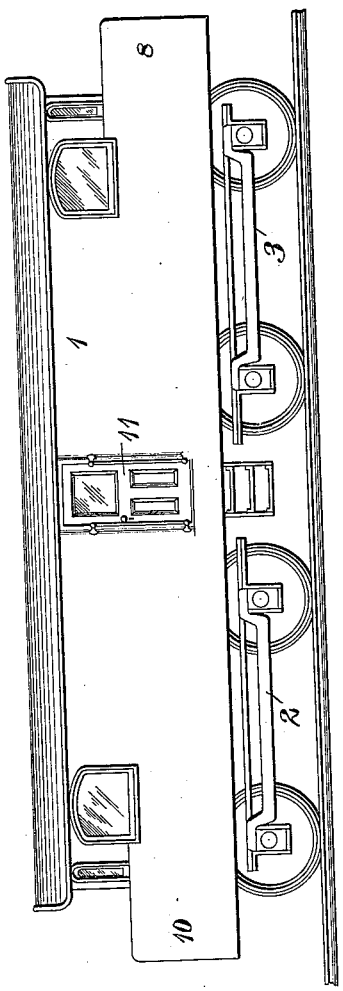
WITNESSES:
Fred H. Miller
R. J. Dearborn
INVENTOR
Norman W. Storer
BY
Kelley E. Carr
ATTORNEY

UNITED STATES PATENT OFFICE.

NORMAN W. STORER, OF PITTSBURGH, PENNSYLVANIA, ASSIGNOR TO WESTINGHOUSE ELECTRIC & MANUFACTURING COMPANY, A CORPORATION OF PENNSYLVANIA.

RAILWAY-VEHICLE.

1,087,053.   Specification of Letters Patent.   Patented Feb. 10, 1914.

Application filed April 4, 1906. Serial No. 309,891.

*To all whom it may concern:*

Be it known that I, NORMAN W. STORER, a citizen of the United States, and a resident of Pittsburgh, in the county of Allegheny and State of Pennsylvania, have invented a new and useful Improvement in Railway-Vehicles, of which the following is a specification.

My invention relates to railway vehicles and has special reference to the cab construction of electric locomotives which are adapted for hauling trains of cars.

The object of my invention is to provide a simple and rigid motor-vehicle cab construction that shall allow an advantageous disposition of the necessary equipment and control apparatus.

Electric locomotives which are employed for drawing trains of cars comprise considerable amounts of control apparatus, brake mechanism and ventilating devices which must be accessible to the attendant and which require adequate protection from the weather, and in order to meet such requirements they have usually been given the general form of closed cars. It is desirable, however, especially in large sizes, to modify the cab construction somewhat in order to dispose of the apparatus to better advantage.

In accordance with my invention, the cab is provided with end projections, which are materially less in height than the body of the vehicle so that they do not interfere with the location of windows and are separately inclosed. These projections, which are located at both ends of the vehicle, are divided by middle passages into pairs of similar sections or compartments.

The frame construction of the locomotive comprises side channels which are so arranged as to form passages in which air pipe or conduit and similar connections may be located. The air compressing devices and the blowers which furnish forced ventilation for the motors are disposed in the inclosed projections at the ends of the locomotive, so that the noise of their operation is muffled and so that they may readily be supplied with fresh air to be distributed from these points through pipes or conduits which are disposed in the passages already described, without affecting the air in the interior of the main body of the vehicle. Sand boxes are also located in the end projections so that they may be kept dry and warm by means of the air pipes from the compressors.

My invention is illustrated in the accompanying drawings in which—

Figure 1 is a view, partially in plan and partially in section but diagrammatic in character, of an electric locomotive constructed in accordance therewith. Fig. 2 is a side elevation and Fig. 3 is a sectional, end elevation of the cab shown in Fig. 1.

Referring to the drawings, a locomotive cab 1 is mounted on trucks 2 and 3 and comprises a main compartment 4 which is provided with recesses 5 and 6, located oppositely at substantially the middle of its sides, and with end compartments 7, 8, 9 and 10. Doors 11 are arranged to open outwardly into the recesses 5 and 6 and doors 12 are located at the ends of the main compartment to open into passages 13 between the end compartments. Air compressors 14 and blowers 15 may preferably be located in the end compartments and the floor of the cab and the frame construction form conduits 16, in which hose or pipe, for conducting the air may be located.

Although a specific structure and a specific arrangement are shown, I desire that only such limitations shall be imposed as are indicated in the appended claims.

I claim as my invention:

1. In a vehicle, an inclosed body portion having separately inclosed end projections to receive air compressors and blowers and a bottom frame structure comprising channel beams which form passages in which conduits may be disposed.

2. In a vehicle, an inclosed body portion having separately inclosed end projections to receive air compressors and blowers and a bottom frame structure comprising channel beams which form passages in which conduits may be disposed.

In testimony whereof, I have hereunto subscribed my name this 30th day of March, 1906.

NORMAN W. STORER.

Witnesses:
J. McFINSTOR,
BIRNEY HINES.

---

Copies of this patent may be obtained for five cents each, by addressing the "Commissioner of Patents, Washington, D. C."